United States Patent
Chung et al.

(10) Patent No.: US 7,893,874 B2
(45) Date of Patent: Feb. 22, 2011

(54) GLOBAL COORDINATE CREATION METHOD FOR PRECISION MEASUREMENT OF HOLLOW FRAME

(75) Inventors: Seong-Youb Chung, Gwangju-si (KR);
Sung-Han Kim, Daejeon (KR);
Se-Hwan Song, Cheonan-si (KR);
Young-Jun Park, Daejeon (KR);
Jae-Hoon Kim, Daejeon (KR)

(73) Assignee: Samsung Heavy Ind. Co., Ltd. (KR)

( * ) Notice: Subject to any disclaimer, the term of this patent is extended or adjusted under 35 U.S.C. 154(b) by 181 days.

(21) Appl. No.: 12/442,331

(22) PCT Filed: Sep. 21, 2007

(86) PCT No.: PCT/KR2007/004664
§ 371 (c)(1),
(2), (4) Date: Mar. 20, 2009

(87) PCT Pub. No.: WO2008/035952
PCT Pub. Date: Mar. 27, 2008

(65) Prior Publication Data
US 2009/0273512 A1  Nov. 5, 2009

(30) Foreign Application Priority Data
Sep. 21, 2006  (KR) .................. 10-2006-0091802

(51) Int. Cl.
*G01S 3/02* (2006.01)
(52) U.S. Cl. ...................................... 342/463
(58) Field of Classification Search ............ 342/463
See application file for complete search history.

(56) References Cited

U.S. PATENT DOCUMENTS 4,662,752 A  5/1987  Tucker et al.
(Continued)

FOREIGN PATENT DOCUMENTS

JP  11230746 A  8/1999
JP  2001194146 A  7/2001

OTHER PUBLICATIONS

Canter et al. "Creating georeferenced indoor maps, images and 3D models", CES Jun. 2010.*

(Continued)

*Primary Examiner*—Thomas H Tarcza
*Assistant Examiner*—Frank McGue
(74) *Attorney, Agent, or Firm*—Harness, Dickey & Pierce, P.L.C.

(57) ABSTRACT

A method of creating a global coordinate of a polyhedral hollow frame includes a first step of providing a plurality of transmitters on a reference surface in the hollow frame, providing a plurality of reference sensors to create the coordinate of the reference surface, and creating a local coordinate frame of the reference surface on the basis of the positional coordinates measured by the reference sensors; a second step of providing reference sensors at common points of a first vertical surface neighboring to the reference surface to measure and store the coordinates of the common points; a third step of providing a plurality of transmitters and reference sensors on the first vertical surface neighboring to the reference surface to create a local coordinate frame of the first vertical surface; a fourth step of transforming the local coordinate frames created at the first and the third steps into a global coordinate frame using the coordinates of the common points measured at the second step; a fifth step of repeatedly performing the second step to the fourth step on remaining vertical surfaces of the polyhedral hollow frame to transform the respective local coordinate frames into a unified global coordinate frame; a sixth step of providing transmitters on an upper surface neighboring to each vertical surface to obtain the relationship between the global coordinate frame and a local coordinate frame of the upper surface using the coordinates of the common point; and a seventh step of creating and applying a global coordinate frame using the relationship obtained at the sixth step.

4 Claims, 4 Drawing Sheets

U.S. PATENT DOCUMENTS

| | | | |
|---|---|---|---|
| 5,196,900 A * | 3/1993 | Pettersen | 356/141.4 |
| 5,305,091 A | 4/1994 | Gelbart et al. | |
| 5,351,056 A * | 9/1994 | Sawyer | 342/195 |
| 5,422,813 A * | 6/1995 | Schuchman et al. | 455/440 |
| 5,990,826 A * | 11/1999 | Mitchell | 342/357.64 |
| 6,009,359 A * | 12/1999 | El-Hakim et al. | 701/28 |
| 6,162,190 A * | 12/2000 | Kramer | 600/595 |
| 6,501,543 B2 * | 12/2002 | Hedges et al. | 356/141.4 |
| 6,556,705 B1 * | 4/2003 | Shalom | 382/154 |
| 6,580,424 B1 * | 6/2003 | Krumm | 345/419 |
| 6,901,673 B1 * | 6/2005 | Cobb et al. | 33/502 |
| 7,006,086 B2 * | 2/2006 | Albeck et al. | 345/419 |
| 7,693,654 B1 * | 4/2010 | Dietsch et al. | 701/207 |
| 2003/0066202 A1 * | 4/2003 | Eaton | 33/503 |
| 2004/0174542 A1 * | 9/2004 | Handman et al. | 356/622 |
| 2005/0151963 A1 * | 7/2005 | Pulla et al. | 356/139.03 |
| 2009/0080766 A1 * | 3/2009 | Daxauer et al. | 382/154 |

OTHER PUBLICATIONS

"The Most Comprehensive Solution for Indoor Mapping Applications", Advertising flyer, Trimble Navigation Limited, copyright 2010.*

* cited by examiner

[Fig. 1]
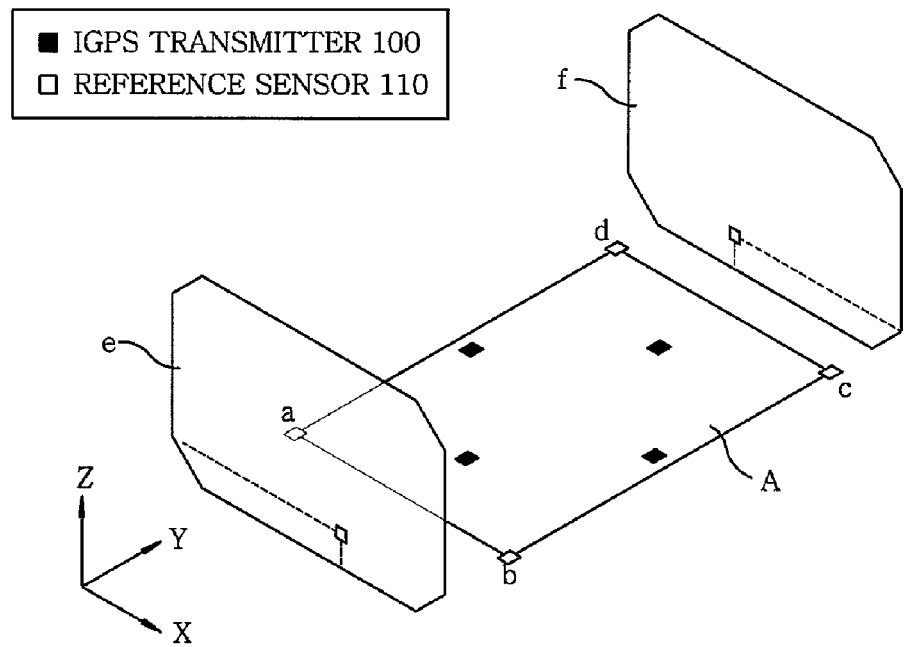
[Fig. 2]
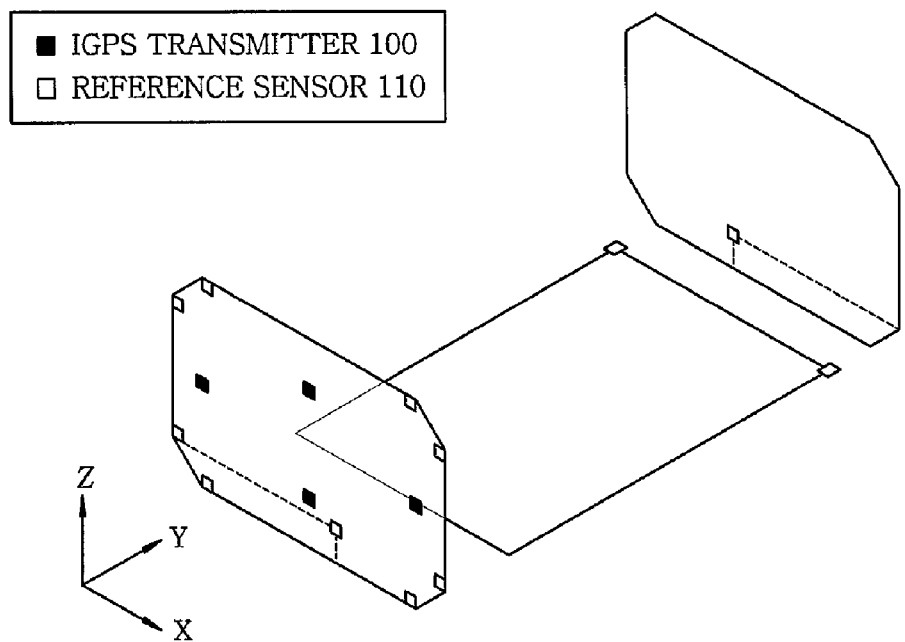

[Fig. 3]
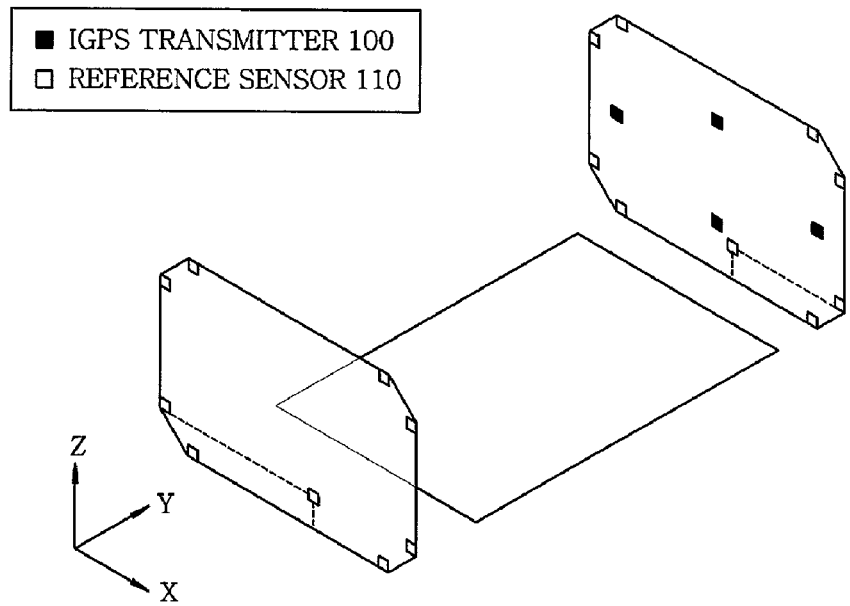
[Fig. 4]
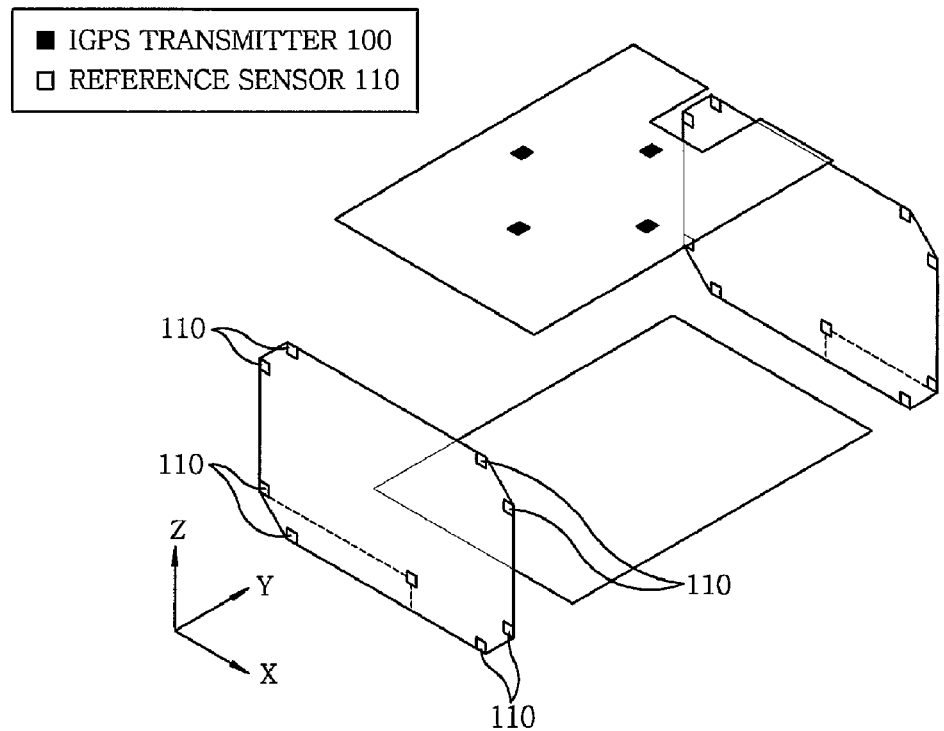

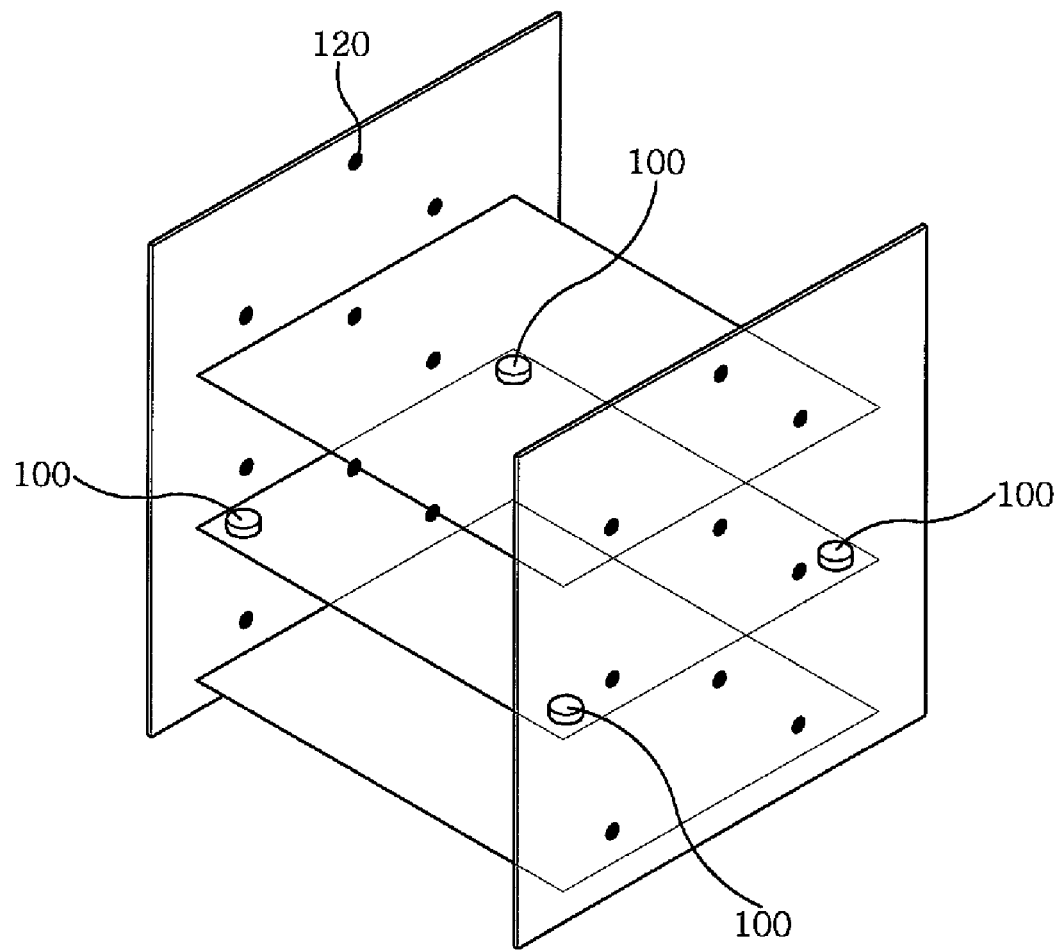
[Fig. 5]

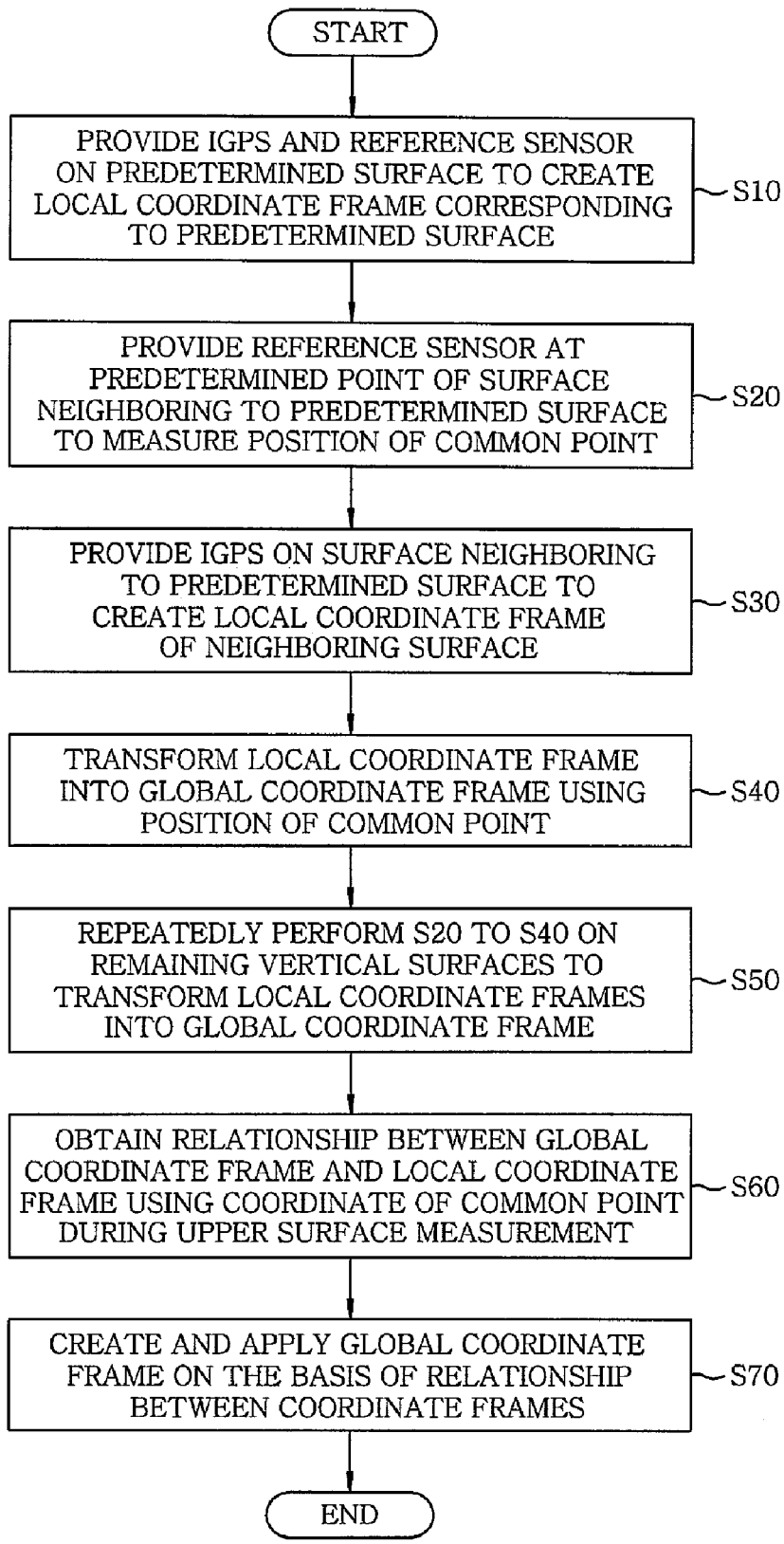
[Fig. 6]

GLOBAL COORDINATE CREATION METHOD FOR PRECISION MEASUREMENT OF HOLLOW FRAME

TECHNICAL FIELD

The present invention relates to a method of creating a global coordinate that creates a three-dimensional coordinate frame in manufacturing a hollow frame, and more particularly, to a method of creating a global coordinate frame that creates a three-dimensional coordinate frame in manufacturing a hollow frame by analyzing signals from a plurality of transmitters in a space using a detector to create one three-dimensional coordinate.

BACKGROUND ART

In general, when a cargo that is used to transport articles such as grain, oil, gas and the like is manufactured, a work is performed in a polyhedral block-like three-dimensional hollow frame. When the work is performed in the hollow frame, due to a spatial restriction including the installation of a precision measuring instrument in the hollow frame, a worker can only perform manual measurement using a measuring tape.

Accordingly, when the work is performed within the hollow frame, an error is cumulated due to inaccurate measurement, and thus a correction work needs to be performed several times. For this reason, the work progress or productivity may be deteriorated.

Furthermore, in manufacturing the three-dimensional hollow frame, the works such as attachment, welding, grinding, and painting need to be performed on each surface of the hollow frame. To this end, a large structure is installed in the hollow frame, which causes a signal from an indoor GPS not to be appropriately transmitted. In addition, the indoor GPS needs to be repeatedly installed and removed at many places in the hollow frame to measure the coordinate of the hollow frame. In this case, however, since a plurality of local coordinate frames is generated, there is a difficulty in managing the data of the measured coordinates.

Furthermore, in the three-dimensional hollow frame, when the surfaces are bonded to each other to form a space, a part to be welded may be located at a higher place. Accordingly, a scaffold is temporarily provided at the inner wall of the hollow frame so as for a worker to get up the scaffold and perform the welding. In this case, however, the laser signals may be shielded by the scaffold. Therefore, all of the places to be measured may not be measured using the indoor GPS that is fixedly installed at a place. For this reason, it is necessary to perform the measurement while moving the indoor GPS at several places, which causes the generation of the local coordinate frames. As a result, there may be a difficulty in collectively managing the measurement data.

DISCLOSURE OF INVENTION

Technical Problem

An object of the invention is to provide a method of creating a global coordinate frame that creates a three-dimensional coordinate frame in manufacturing a hollow frame by analyzing signals from a plurality of transmitters in the hollow frame using a reference sensor and generating one global coordinate, thereby improving measurement precision.

Technical Solution

According to an aspect of the invention, there is provided a method of creating a global coordinate frame of a polyhedral hollow frame, which includes: a first step of providing a plurality of transmitters on a reference surface in the hollow frame, providing a plurality of reference sensors to create the coordinate of the reference surface, and creating a local coordinate frame of the reference surface on the basis of the positional coordinates measured by the reference sensors; a second step of providing reference sensors at common points of a first vertical surface neighboring to the reference surface to measure and store the coordinates of the common points; a third step of providing a plurality of transmitters and reference sensors on the first vertical surface neighboring to the reference surface to create a local coordinate frame of the first vertical surface; a fourth step of transforming the local coordinate frames created at the first and the third steps into a global coordinate frame using the coordinates of the common points measured at the second step; a fifth step of repeatedly performing the second step to the fourth step on remaining vertical surfaces of the polyhedral hollow frame to transform the respective local coordinate frames into a unified global coordinate frame; a sixth step of providing transmitters on an upper surface neighboring to each vertical surface to obtain the relationship between the global coordinate frame and a local coordinate frame of the upper surface using the coordinates of the common point; and a seventh step of creating and applying a global coordinate frame using the relationship obtained at the sixth step.

ADVANTAGEOUS EFFECTS

According to the aspect of the invention, a plurality of transmitters is provided in a three-dimensional space, and a detector analyzes the signals from the transmitters to create a unified coordinate. Therefore, accurate position and posture relationship can be calculated, and as a result, measurement precision can be improved.

BRIEF DESCRIPTION OF THE DRAWINGS

FIG. 1 is a diagram illustrating a process of providing IGPS transmitters on a bottom surface of a hollow frame to create local coordinate s according to an embodiment of the invention;

FIG. 2 is a diagram illustrating a global coordinate transform process using IGPS transmitters provided on a vertical surface and reference sensors according to an embodiment of the invention;

FIG. 3 is a diagram illustrating a global coordinate transform process using IGPS transmitters provided on an opposing vertical surface and reference sensors according to an embodiment of the invention;

FIG. 4 is a diagram illustrating a global coordinate transform process using IGPS transmitters provided on a neighboring vertical surface according to an exemplary embodiment of the invention;

FIG. 5 is a diagram illustrating a method of maintaining a global coordinate in a space according to an embodiment of the invention; and FIG. 6 is a flowchart illustrating a method of creating a global coordinate using an IGPS transmitter according to an embodiment of the invention.

BEST MODE FOR CARRYING OUT THE INVENTION

An embodiment of the invention will now be described in detail with reference to the accompanying drawings.

The GPS (Global Positioning System) refers to a concept that determines the position of a receiver using three or more GPS satellites, and this concept is applied to the indoor, thereby implementing an IGPS (Indoor GPS) described below. That is, if a plurality of transmitters is provided in a space and a receiver is located at a predetermined position, a relative three-dimensional coordinate value to the predetermined position can be obtained. The details thereof are disclosed in U.S. Pat. No. 6,501,543, the disclosure of which is incorporated herein by reference.

A three-dimensional global coordinate system according to an embodiment of the invention includes a plurality of IGPSs, each composed of transmitters and receivers provided on a bottom surface (A), a first vertical surface (e) perpendicular to the bottom surface (A) and a second vertical surface f opposing the first vertical surface (e) or other vertical surfaces (not shown) neighboring to the first and second vertical surfaces (e and f), and an upper surface in a three-dimensional hollow frame; and reference sensors 110 that are provided at common points of the bottom surface (A), the vertical surfaces, and the upper surface to set the coordinate reference. With this configuration, the relative local coordinates of the individual surfaces are obtained, and the positions of the common points that are used to measure the local coordinates are matched with the local coordinates. In this way, the local coordinates of the individual surfaces are integrated into a single global coordinate.

FIG. 1 is a diagram illustrating a process of providing an IGPS composed of an IGPS transmitter and a reference sensor serving a receiver on a bottom surface of a three-dimension hollow frame to create a local coordinate according to an embodiment of the invention.

As shown in FIG. 1, in order to create the three-dimensional coordinate of the hollow frame, it is necessary to provide a reference coordinate frame for measuring the spatial coordinate of a predetermined point of an object in a three-dimensional space using a three-dimensional position measurement apparatus.

First, in order to create the local coordinate frame of the bottom surface (A), a plurality of IGPS transmitters 100 are provided on the bottom surface (A), and a plurality of reference sensors 110 are provided at the corners (a, b, c, and d) of the bottom surface (A). Then, the local coordinate frame of the bottom surface (A) is created.

When a work is performed on a wall surface in the three-dimensional hollow frame, for the local coordinate transform of the wall surface, after the local coordinates of the bottom surface are created using the IGPS transmitters 100 provided on the bottom surface (A), one or more reference sensors 110 are provided on a wall surface neighboring to the bottom surface (A), for example, a wall surface (e), to measure the coordinate of that point. The point on the wall surface (e) where the reference sensor is provided is used as a common point for obtaining a global coordinate.

FIG. 2 is a diagram illustrating a global coordinate transform process using IGPS transmitters and reference sensors provided on a vertical surface according to an embodiment of the invention.

As shown in FIG. 2, a plurality of IGPS transmitters 100 are provided on a vertical surface in the three-dimensional space, for example, the first vertical surface (e), and reference sensors 110 are provided at corners of the first vertical surface (e), to thereby create the local coordinates of the first vertical surface (e). Next, the local coordinate frames of the bottom surface (A) and the first vertical surface (e) are transformed into a single unified global coordinate frame using the coordinate of the common point.

More specifically, when a work is performed on the first vertical surface (e) in the three-dimensional hollow frame, for the sake of transforming into a global coordinate, the plurality of IGPS transmitters 100 are provided on the first vertical surface (e), and the reference sensors 110 are provided at corners of the first vertical surface (e), to thereby obtain the local coordinates of the first vertical surface (e). Then, the obtained local coordinates are transformed into a single unified global coordinate frame using the coordinate of the common point. The transformed global coordinate is stored in a coordinate storage unit (not shown).

FIG. 3 is a diagram illustrating a global coordinate frame transform process using IGPS transmitters 100 and reference sensors 110 provided on a second vertical surface (f) opposing the first vertical surface (e) according to an embodiment of the invention.

As shown in FIG. 3, reference sensors 110 are provided at one or more points on the second vertical surface (f), to measure and store the coordinates of those points. The positions of the points are used as the coordinates of the common points.

Next, when a work is performed on the second vertical surface (f), for the global coordinate transform, a plurality of IGPS transmitters 100 are provided on the second vertical surface (f), and reference sensors 110 are provided at corners of the second vertical surface (f), to thereby create the local coordinates of the second vertical surface (f). Next, as described above, the local coordinates are transformed into a single unified global coordinate using the coordinates of the common points of the reference sensors provided on the second vertical surface (f). Subsequently, the transformed global coordinate is stored in the coordinate storage unit.

FIG. 4 is a diagram illustrating a global coordinate frame transform process using IGPS transmitters provided on an upper surface neighboring to the vertical surface according to an embodiment of the invention.

As shown in FIG. 4, a plurality of IGPS transmitters 100 are provided on a surface neighboring to the vertical surface, that is, an upper surface. Then, the relationship between the global coordinate frame and the local coordinate frames is obtained using the coordinates of the common points of the previously provided reference sensors. Subsequently, the local coordinate frames are transformed into a global coordinate frame.

The configuration that the IGPS transmitters are provided on the surface neighboring to the vertical surface is to transform the local coordinate frame into the global coordinate frame when a work is performed on the surface neighboring to the vertical surface in the three-dimensional hollow frame, that is, the upper surface. Specifically, the IGPS transmitters 100 are provided on the surface neighboring to the vertical surface, and the global coordinate of the common reference sensors is stored in the coordinate storage unit.

FIG. 5 is a diagram illustrating a method of maintaining a global coordinate frame in a three-dimensional hollow frame according to an embodiment of the invention. As shown in FIG. 5, when the global coordinate frame of the vertical surface is created, a plurality of common points 120, for example, three or more common points 120, are measured and marked, and the measured coordinates of the common points 120 are stored.

While a work is being performed in the three-dimensional hollow frame, the IGPS transmitters 100 are provided in a work area in the hollow frame.

After the IGPS transmitters 100 are provided, the relationship between the local coordinate frame and the global coordinate frame is obtained using the previously measured points 120.

In this connection, a transform method between the global coordinate frame at the bottom surface and the coordinate frame at the vertical surface is as follows.

Coordinate Frame Transform Method
Global Coordinate Frame at bottom surface: {G}
Coordinate Frame by three or more reference sensors: {R}

↓$_R^G T$

Coordinate Frame at Vertical Surface: {H}

↓$_R^H T$

Coordinate Frame Transform between {H} and {G}

$$_H^G T =\, _R^G T (_R^H T)^{-1}$$

FIG. 6 is a flowchart illustrating a method of setting a global coordinate frame using IGPS transmitters according to an embodiment of the invention.

As shown in FIG. 6, an object coordinate system (□□ □□?) for creating a three-dimensional coordinate should measure a spatial coordinate of a predetermined point of an object using a three-dimensional position measuring apparatus.

First, a plurality of IGPSs each composed of transmitters and receivers are provided on the reference surface in the hollow frame, for example, the bottom surface (A). The local coordinate frame of the bottom surface is created using the positional coordinates measured by the reference sensors 110 of the IGPSs (step S10).

Next, after the local coordinate frame of the bottom surface (A) is created, the reference sensors 110 are provided at the common points of a surface neighboring to the bottom surface (A), for example, the first vertical surface (e), to thereby measure and store the positional coordinates of the common points (step S20).

Next, a plurality of IGPSs is provided on the first vertical surface (e) neighboring to the bottom surface (A), to thereby create the local coordinate frame of the first vertical surface e (step S30).

Next, the local coordinate frame created at step S30 and the local coordinate frame created at step S10 are incorporated using the positional coordinates of the common points stored at step S20 and then transformed into a single global coordinate frame (step S40).

Next, steps S20 to S40 are repeatedly performed on the remaining vertical surfaces to transform each of the local coordinate frames into a single unified global coordinate frame (Step S50).

Next, when the upper surface neighboring to each vertical surface is measured, after the IGPSs are provided, the relationship between the global coordinate frame and the local coordinate frame is obtained using the coordinates of the common points previously provided at the corresponding vertical surface (step S60).

Next, the relationship obtained at the above step is applied to create and apply the global coordinate frame (step S70).

In case where additional structures are provided in the three-dimensional hollow frame, the positions of all the vertexes thereof may not be measured at one time. In this case, the positions of the vertexes are measured by the above-described method to calculate the global coordinate frame as the unified coordinate and grasp the positions. Then, the coordinates in the three-dimensional hollow frame can be collectively managed.

Although the invention has been described in connection with the embodiment by way of the accompanying drawings, it should be noted that the embodiment is not limitative, but illustrative. It will be apparent to those skilled in the art that various modifications and changes can be made without departing from the scope and spirit of the invention.

The invention claimed is:

1. A method of creating a global coordinate of a polyhedral hollow frame, the method comprising the steps of:
    a first step of providing a plurality of transmitters on a reference surface in the hollow frame, providing a plurality of reference sensors to create the coordinate of the reference surface, and creating a local coordinate frame of the reference surface on the basis of the positional coordinates measured by the reference sensors;
    a second step of providing reference sensors at common points of a first vertical surface neighboring to the reference surface to measure and store the coordinates of the common points;
    a third step of providing a plurality of transmitters and reference sensors on the first vertical surface neighboring to the reference surface to create a local coordinate frame of the first vertical surface;
    a fourth step of transforming the local coordinate frames created at the first and the third steps into a global coordinate frame using the coordinates of the common points measured at the second step;
    a fifth step of repeatedly performing the second step to the fourth step on remaining vertical surfaces of the polyhedral hollow frame to transform the respective local coordinate frames into a unified global coordinate frame;
    a sixth step of providing transmitters on an upper surface neighboring to each vertical surface to obtain the relationship between the global coordinate frame and a local coordinate frame of the upper surface using the coordinates of the common point; and
    a seventh step of creating and applying a global coordinate frame using the relationship obtained at the sixth step.

2. The method of claim 1, wherein the reference sensors are provided at the common points having three or more marked points when the IGPS is provided on a vertical surface in the hollow frame.

3. The method of claim 1, wherein the common points are points where signals are received from the transmitters on a surface neighboring to the reference surface corresponding to a predetermined local coordinate when the respective local coordinates are measured.

4. The method of claim 1, wherein, when a global coordinate frame at a bottom surface is {G};
    a coordinate frame by three or more reference sensors is {R} represented by
    ↓$_R^G T$;
    and
    a coordinate frame at a vertical surface is {H} represented by
    ↓$_R^H T$,
    a coordinate frame transform between {H} and {G} is represented by
    $$_H^G T =\, _R^G T (_R^H T)^{-1}.$$

* * * * *